United States Patent
Fischer et al.

(10) Patent No.: US 6,773,056 B2
(45) Date of Patent: Aug. 10, 2004

(54) MODULARLY CONSTRUCTED DRIVER'S CAB CONSTRUCTION SERIES FOR HEAVY-GOODS VEHICLES

(75) Inventors: Herbert Fischer, Weil der Stadt (DE); Karl-Heinz Schuller, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 59 days.

(21) Appl. No.: 10/120,162

(22) Filed: Apr. 11, 2002

(65) Prior Publication Data

US 2003/0025357 A1 Feb. 6, 2003

(30) Foreign Application Priority Data

Apr. 12, 2001 (DE) .......................................... 101 18 344

(51) Int. Cl.$^7$ .............................................. B62D 33/06
(52) U.S. Cl. .............................. 296/190.08; 296/26.08; 296/193.04
(58) Field of Search ........................ 296/26.08, 190.01, 296/190.04, 190.08, 197, 196, 195, 35.3, 190.02, 193.04

(56) References Cited

U.S. PATENT DOCUMENTS

| | | | |
|---|---|---|---|
| 4,050,735 A | | 9/1977 | Molnar |
| 5,159,746 A | * | 11/1992 | Saggese ................. 296/190.08 |
| 5,310,239 A | * | 5/1994 | Koske et al. ............ 296/26.08 |
| 5,560,673 A | | 10/1996 | Angelo |
| 6,178,612 B1 | | 1/2001 | Gernstein |
| 6,276,748 B1 | * | 8/2001 | Gobessi et al. ............. 296/197 |

FOREIGN PATENT DOCUMENTS

| | | |
|---|---|---|
| DE | 3617961 A1 | 12/1987 |
| DE | 4302489 C2 | 6/1995 |
| EP | 0361511 B1 | 2/1993 |
| EP | 0716005 B1 | 6/1996 |

\* cited by examiner

Primary Examiner—Jason Morrow
(74) Attorney, Agent, or Firm—Crowell & Moring LLP

(57) ABSTRACT

A modularly constructed driver's cab construction series for heavy-goods vehicles can produce driver's cab variants with different length dimensions. A basic module is constructed as standard for all driver's cab variants, and a built-on module can be built on the basic module. Built-on modules can have different length dimensions for different driver's cab variants. The basic module has a front wall, two side walls, a door and door frame, a bottom and a roof, is made open to the rear, and possesses, at the rear, an annularly closed first flange-mounting region. The built-on module has a rear wall, two side-wall portions, a bottom portion and a roof portion, is made open to the front, and possesses, at the front, an annularly closed second flange-mounting region complementary to the first flange-mounting region. On the built-on module, the side-wall portions, the bottom portion and the roof portion have different length dimensions for each driver's cab variant.

33 Claims, 1 Drawing Sheet

MODULARLY CONSTRUCTED DRIVER'S CAB CONSTRUCTION SERIES FOR HEAVY-GOODS VEHICLES

This application claims the priority of German application 101 18 344.5, filed Apr. 12, 2001, the disclosure of which is expressly incorporated by reference herein.

BACKGROUND AND SUMMARY OF THE INVENTION

The present invention relates to a modularly constructed driver's cab construction series for heavy-goods vehicles by which driver's cab variants with different length dimensions can be produced.

German patent publication DE 43 02 489 C2 discloses a driver's cab construction series of this kind by which driver's cab variants, with different length dimensions, can be produced. To provide different driver's cab lengths, the known driver's cabs possess side walls which can have different dimensions, depending on the driver's cab lengths. A roof and a bottom of each driver's cab are likewise dimensioned differently according to the desired driver's cab length.

German patent publication DE 36 17 961 C2 likewise shows that essentially identical components can be used in order to construct different driver's cab variants. In this case, to provide different driver's cab lengths, differently dimensioned roofs and side walls are mounted.

The same procedure may also be gathered from European patent publication EP 0 716 005 B1 and EP 0 361 511 B1, in each of which the side walls, the roof, and the bottom are dimensioned differently in order to produce different driver's cab lengths.

The present invention is concerned with the problem of specifying, for a driver's cab construction series of the type mentioned in the introduction, an embodiment which permits simplified and cost-effective production of different driver's cab variants.

This problem is solved, according to this invention, by providing a driver's cab construction series with a basic module, constructed as standard for all variants, and a built-on module, which can be built on the basic module. The basic module has a front wall, two side walls, a door and door frame, a bottom, and a roof, is made open to the rear, and, at its rear, possesses an annularly closed first flange-mounting region. The built-on module has a rear wall, two side-wall portions, a bottom portion, and a roof portion, is made open to the front and, at the front, possesses an annularly closed second flange-mounting region complementary to the first flange-mounting region. The side-wall portions, the bottom portion, and the roof portion have different length dimensions for each driver's cab variant.

This invention, therefore, is based on the general idea of providing, for all driver's cab variants, a standard basic module with a front wall, roof, and bottom, and with two side walls, including doors and door frames. The basic module is capable of being completed by built-on modules of different lengths to form a driver's cab. According to the invention, the built-on module has a rear wall of the driver's cab and also two side-wall portions, a bottom portion and a roof portion. In the built-on state, the side-wall portions, the bottom portion, and the roof portion prolong the basic module in the region of its side walls, its roof and its bottom. The design of the driver's cab variants is governed correspondingly by the design of built-on module variants in the case of a basic module which is constant for all the variants.

The modules can be pre-assembled parallel to one another and, in final assembly, be completed to form the driver's cab. This procedure simplifies the series production of the driver's cabs.

A particular advantage of the present invention is that the built-on modules each have a rear wall of the driver's cab, so that the basic module can be made open to the rear. This makes it easier to fit out the interior of the basic model, since access through this large opening is improved considerably. The same applies accordingly to the built-on module which opens to the front.

So that a respective built-on module can be built on the basic module in a particularly simple way, the basic module is equipped at its rear with an annularly closed first flange-mounting region, while each built-on module has at its front a second flange-mounting region complementary to it.

According to a preferred embodiment, the built-on module itself may be modularly constructed and have a rear-wall module, constructed as standard for all driver's cab variants, and at least one intermediate module built onto the rear wall module. This intermediate module has, for each driver's cab variant, side-wall portions, a bottom portion, and a roof portion with different length dimensions. The module is made open to the front, possesses, at the front, the second flange-mounting region, is made open to the rear, and possesses, at the rear, an annularly closed third flange-mounting region. The rear-wall module has the rear wall and, at the front, possesses an annularly closed fourth flange-mounting region, complementary to the third flange-mounting region. This development is based on the general idea of forming the different driver's cab variants solely by variants of the intermediate module which is inserted between the basic module and the rear-wall module in the vehicle longitudinal direction. To that extent, an additional standardization can be achieved during manufacture.

Of particular advantage, in this case, is a variant in which the fourth flange-mounting region is designed compatibly with the first flange-mounting region. This form of construction makes it possible also to build the rear-wall module directly on the basic module, insofar as a particularly short form of construction managing without an intermediate module is required for the driver's cab. The result of this form of construction, moreover, is that two or more intermediate modules can also be built on one another, in order to achieve specific longitudinal dimensions for the driver's cab.

In an expedient embodiment, the driver's cab has driver's cab bearings, by means of which the driver's cab can be mounted on is mounted on a carrying frame of the heavy-goods vehicle. These driver's cab bearings are standard on the basic model for all the driver's cab variants. These driver's cab bearings form virtually a kind of mechanical interface for the tie-up of the driver's cab to the carrying frame of the heavy-goods vehicle. Attaching these driver's cab bearings to the basic module results in a standard interface, with the result that the configuration of the carrying frame and the mounting of the driver's cab always remain the same, irrespective of the length variant of the latter.

Preferably, each side wall of the basic module comprises a B-column of the driver's cab, with the result that the basic module has an essentially self-supporting design.

In a particularly advantageous development, the basic module has, at the rear, a closed carrier ring comprising two B-columns which are connected to one another via a roof crossmember and a bottom crossmember. The first flange-mounting region is formed in the region of this carrier ring. This construction leads to a particularly rigid and stable design of the basic module, for example in order to achieve a required degree of crash safety. Since the basic module is already of inherently stable design, the flange connections between the basic module and the built-on module do not have to satisfy any particularly high rigidity and stability requirements, so that the flange-mounting regions can have a relatively simple construction and can accordingly be produced cost-effectively and mounted easily.

Further important features and advantages of the invention may be understood from dependent claims, from the drawings and from the accompanying figure descriptions with reference to the drawings. A cab construction process is also claimed.

The features mentioned above and those explained below can be used not only in the combinations specified in each case, but also in other combinations or alone, without departing from the scope of the present invention.

Preferred exemplary embodiments of the invention are illustrated in the drawings and are explained in more detail in the following description.

DETAILED DESCRIPTION OF THE INVENTION

Figure 1:
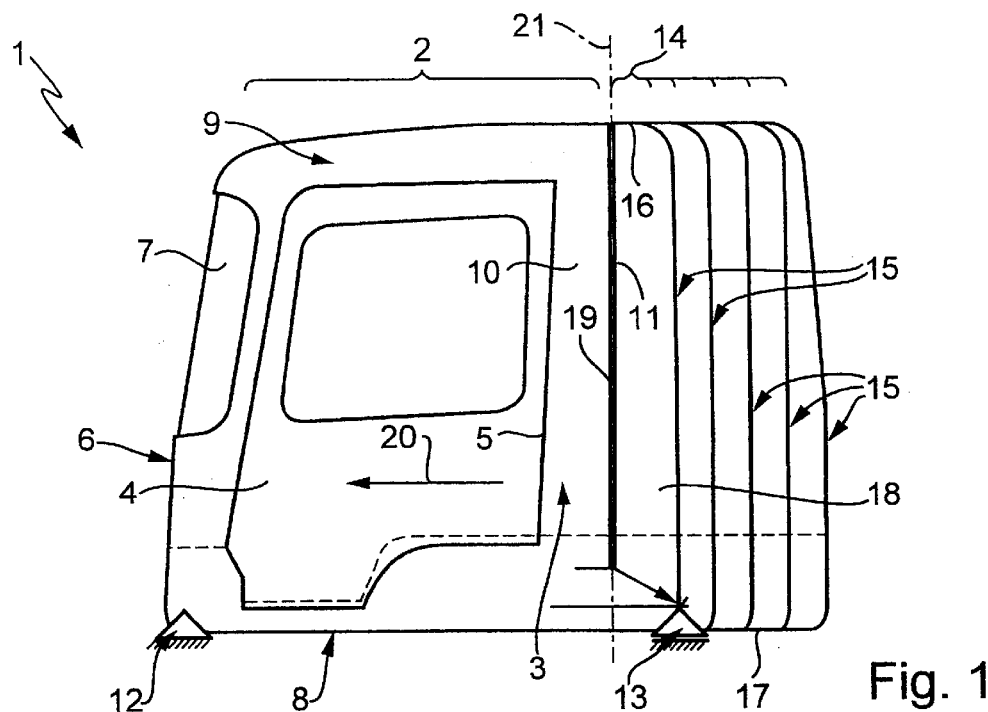
FIG. 1 shows a side view of a driver's cab according to the invention.
Figure 2:
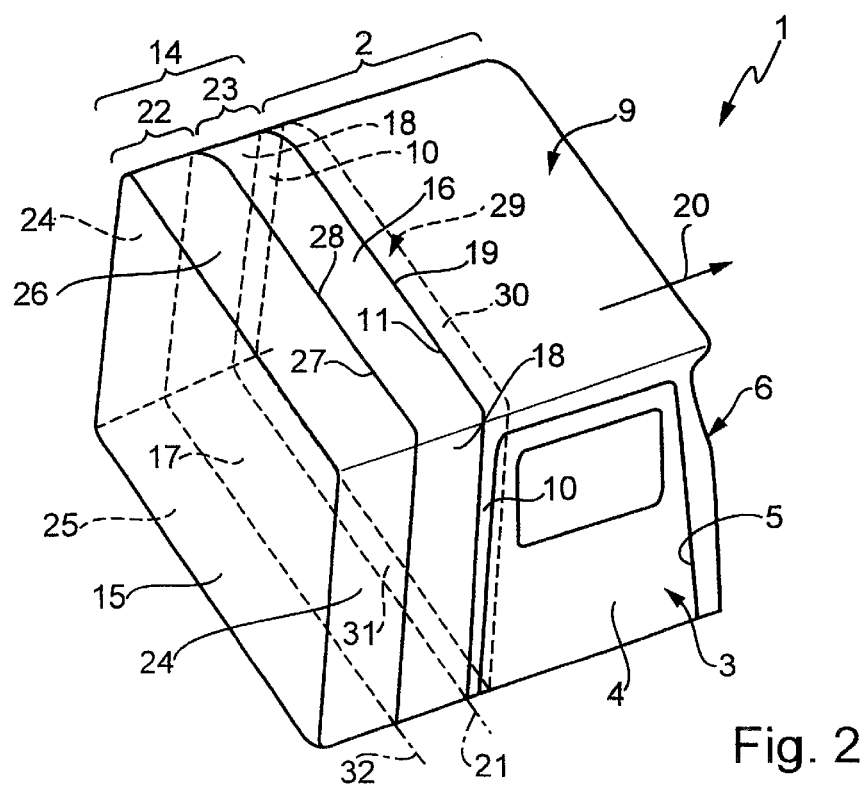
FIG. 2 shows a perspective view of a driver's cab according to the invention, but in a special embodiment of the invention.

According to FIGS. 1 and 2, a driver's cab 1 according to the invention has a basic module 2, identified by a brace, which, on each vehicle side, has a side wall 3, in each case with a door 4 and a door frame 5, and also a front wall 6 with windscreen 7, a bottom 8 and a roof 9. The basic module 2 extends in this case from the front wall 6 to the rear to an extent such that its side walls 3 comprise what are known as B-columns 10. The basic module 2 is made open to the rear and there possesses an annularly closed first flange-mounting region 11.

Formed on the basic module 2 are at least one front driver's cab bearing 12 and at least one rear driver's cab bearing 13. The driver's cab 1 can be mounted on a carrying frame, not shown, of a heavy-goods vehicle by these bearings.

According to the invention, moreover, the driver's cab 1 has, for each driver's cab variant, a corresponding built-on module 14, of which five different variants are illustrated in FIG. 1 and are identified by braces and differ from one another in their length dimensions. Each built-on module 14 has a rear wall 15, a roof portion 16 of greater or lesser length, a bottom portion 17 of greater or lesser length and also two side-wall portions 18 of greater or lesser length. The built-on module 14 is made open to the front and, at the front, possesses an annularly closed second flange-mounting region 19 which is designed complementarily to the first flange-mounting region 11 of the basic module 2. In the preferred embodiment shown here, the first and the second flange-mounting regions 11 and 19 lie essentially in a first parting plane 21 running perpendicularly to a vehicle longitudinal direction 20 symbolized by an arrow. Production tolerances can be compensated for in a particularly simple way by virtue of this form of construction.

The built-on module 14 can be fastened to the basic module 2 between the flange-mounting regions 11 and 19 via the flanged connection, for example by means of adhesive joints and/or screw connections. In the built-on state, the side-wall portions 18 prolong the side walls 3, while the bottom portion 17 prolongs the bottom 8 and the roof portion 16 the roof 9 in each case to the rear in the vehicle longitudinal direction. Different longitudinal dimensions can be implemented in this case for the driver's cab 1, depending on the built-on module variant. It is particularly important here that the same driver's cab bearings 12, 13 or the identical positions for the driver's cab bearings 12, 13 can always be maintained for all the driver's cab variants.

In the special embodiment according to FIG. 2, the built-on module 14 shown is itself modularly constructed and has a rear-wall module 22 and an intermediate module 23. The rear-wall module 22 is constructed as standard for all driver's cab variants and has the rear wall 15. Furthermore, according to this preferred embodiment, the rear-wall module 22 can possess two side-wall extensions 24, a bottom extension 25 and a roof extension 26.

The intermediate module 23 consists essentially of the roof portion 16, the bottom portion 17, and the two side-wall portions 18 of the built-on module 14. The intermediate module 23 is made open both to the front and to the rear. At the front, the intermediate module has the second flange-mounting region 19, while at the rear, it possesses a third flange-mounting region 27.

The rear-wall module 22 has at the front a fourth flange-mounting region 28 which is designed complementarily to the third flange-mounting region 27 of the intermediate module 23. As may be gathered from FIG. 2, the third and fourth flange-mounting regions 27 and 28 lie essentially in a second parting plane 32 running perpendicularly to the vehicle longitudinal direction 20. In a preferred embodiment, the fourth flange-mounting region 28 may be designed compatibly with the first flange-mounting region 11, so that the rear-wall module 22 can be built directly on the basic module 2, even without the intermediate module 23 being interposed. This is done in order, for example, to achieve a particularly short form of construction for the driver's cab 1. To achieve different driver's cab variants with different longitudinal dimensions, then, an intermediate module 23 can be mounted between the rear-wall module 22 and the basic module 2, variants of different length being provided for the intermediate module 23. It is likewise possible to mount two or more intermediate modules 23.

According to FIG. 2, in the special embodiment shown here, the basic module 2 may have, at the rear, a closed carrier ring 29 which comprises the two B-columns 10 and, also, a roof crossmember 30 and a bottom crossmember 31. The B-columns 10, the roof crossmember 30 and the bottom crossmember 31 are fastened to one another and form an inherently rigid closed frame by which the basic module 2 acquires high rigidity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A modularly constructed driver's cab construction series for heavy-goods vehicles by which driver's cab variants with different length dimensions can be produced, comprising:

a basic cab on which at least one front driver's cab bearing and at least one rear driver's cab bearing are formed and which is constructed as standard for all of the variants, and a built-on module which can be built on said basic module, the basic cab having a front wall, two side walls, a door and door frame, a bottom, and a roof, being made open to the rear, and, at its rear, possessing an annularly closed first flange-mounting region, the built-on module having a rear wall, two side-wall portions, a bottom portion and a roof portion, being made open to the front and, at the front, possessing an annularly closed second flange-mounting region complementary to the first flange-mounting region, the built-on module adapted to be fastened to the basic cab between the first flange-mounting region and the second flange-mounting region by a flanged connection, and the side-wall portions, the bottom portion and the roof portion having different length dimensions for each driver's cab variant.

2. The driver's cab construction series according to claim 1, wherein the first and the second flange-mounting regions lie essentially in a first parting plane running perpendicularly to a vehicle longitudinal direction.

3. The driver's cab construction series according to claim 1, wherein the built-on module is modularly constructed and has a rear wall module constructed as standard for all driver's cab variants and at least one intermediate module which can be built on said rear-wall module, the intermediate module having, for each driver's cab variant, the side-wall portions, the bottom portion and the roof portion with different length dimensions, being made open to the front, possessing, at the front, the second flange-mounting region, being made open to the rear and possessing at the rear an annularly closed third flange-mounting region, the rear-wall module having the rear wall and, at the front, possessing an annularly closed fourth flange-mounting region complementary to the third flange-mounting region.

4. The driver's cab construction series according to claim 3, wherein the third and fourth flange-mounting regions lie essentially in a second parting plane lying perpendicularly to the vehicle longitudinal direction.

5. The driver's cab construction series according to claim 3, wherein the rear-wall module has two side-wall extensions, a bottom extension, and a roof extension.

6. The driver's cab construction series according to claim 3, wherein the fourth flange-mounting region is designed compatibly with the first flange-mounting region.

7. The driver's cab construction series according to claim 1, wherein the driver's cab can be mounted on a carrying frame of the heavy-goods vehicle by the driver's cab bearings formed on the basic cab, the driver's cab bearings being standard on the basic cab for all driver's cab variants.

8. The driver's cab construction series according to claim 1, wherein each of the side walls of the basic cab comprises a B-column.

9. The driver's cab construction series according to claim 1, wherein the basic cab has, at its rear, a closed carrier ring comprising two B-columns which are connected to one another via a roof crossmember and a bottom crossmember, the first flange-mounting region being formed in the region of this carrier ring.

10. The driver's cab construction series according to claim 2, wherein the built-on module is modularly constructed and has a rear-wall module constructed as standard for all driver's cab variants and at least one intermediate module which can be built on said rear-wall module, the intermediate module having, for each driver's cab variant, the side-wall portions, the bottom portion and the roof portion with different length dimensions, being made open to the front, possessing, at the front, the second flange-mounting region, being made open to the rear and possessing at the rear an annularly closed third flange-mounting region, the rear-wall module having the rear wall and, at the front, possessing an annularly closed fourth flange-mounting region complementary to the third flange-mounting region.

11. The driver's cab construction series according to claim 10, wherein the third and fourth flange-mounting regions lie essentially in a second parting plane lying perpendicularly to the vehicle longitudinal direction.

12. The driver's cab construction series according to claim 4, wherein the rear-wall module has two side-wall extensions, a bottom extension, and a roof extension.

13. The driver's cab construction series according to claim 4, wherein the fourth flange-mounting region is designed compatibly with the first flange-mounting region.

14. The driver's cab construction series according to claim 5, wherein the fourth flange-mounting region is designed compatibly with the first flange-mounting region.

15. The driver's cab construction series according to claim 2, wherein the driver's cab can be mounted on a carrying frame of the heavy-goods vehicle by the driver's cab bearings formed on the basic cab, the driver's cab bearings being standard on the basic cab for all driver's cab variants.

16. The driver's cab construction series according to claim 3, wherein the driver's cab can be mounted on a carrying frame of the heavy-goods vehicle by the drivers' cab bearings formed on the basic cab, the driver's cab bearings being standard on the basic cab for all driver's cab variants.

17. The driver's cab construction series according to claim 4, wherein the driver's cab can be mounted on a carrying frame of the heavy-goods vehicle by the driver's cab bearings formed on the basic cab, the driver's cab bearings being standard on the basic cab for all driver's cab variants.

18. The driver's cab construction series according to claim 5, wherein the driver's cab can be mounted on a carrying frame of the heavy-goods vehicle by the driver's cab bearings formed on the basic cab, the driver's cab bearings being standard on the basic cab for all driver's cab variants.

19. The driver's cab construction series according to claim 6, wherein the driver's cab can be mounted on a carrying frame of the heavy-goods vehicle by the driver's cab bearings formed on the basic cab, the driver's cab bearings being standard on the basic cab for all driver's cab variants.

20. The driver's cab construction series according to claim 2, wherein each of the side walls of the basic cab comprises a B-column.

21. The driver's cab construction series according to claim 3, wherein each of the side walls of the basic cab comprises a B-column.

22. The driver's cab construction series according to claim 4, wherein each of the side walls of the basic cab comprises a B-column.

23. The driver's cab construction series according to claim 5, wherein each of the side walls of the basic cab comprises a B-column.

24. The driver's cab construction series according to claim 6, wherein each of the side walls of the basic cab comprises a B-column.

25. The driver's cab construction series according to claim 7, wherein each of the side walls of the basic cab comprises a B-column.

26. The driver's cab construction series according to claim 2, wherein the basic cab has, at its rear, a closed carrier ring comprising two B-columns which are connected to one another via a roof crossmember and a bottom crossmember, the first flange-mounting region being formed in the region of this carrier ring.

27. The driver's cab construction series according to claim 3, wherein the basic cab has, at its rear, a closed carrier ring comprising two B-columns which are connected to one another via a roof crossmember and a bottom crossmember, the first flange-mounting region being formed in the region of this carrier ring.

28. The driver's cab construction series according to claim 4, wherein the basic cab at its rear, a closed carrier ring comprising two B-columns which are connected to one another via a roof crossmember and a bottom crossmember, the first flange-mounting region being formed in the region of this carrier ring.

29. The driver's cab series according to claim 5, wherein the basic cab has, at its rear, a closed carrier ring comprising two B-columns which are connected to one another via a roof crossmember and a bottom crossmember, the first flange-mounting region being formed in the region of this carrier ring.

30. The driver's cab construction series according to claim 6, wherein the basic cab has, at its rear, a closed carrier ring comprising two B-columns which are connected to one another via a roof crossmember and a bottom crossmember, the first flange-mounting region being formed in the region of this carrier ring.

31. The driver's cab construction series according to claim 7, wherein he basic cab has, at its rear, a closed carrier ring comprising two B-columns which are connected to one another via a roof crossmember and a bottom crossmember, the first flange-mounting region being formed in the region of this carrier ring.

32. The driver's cab construction series according to claim 8, wherein the basic cab has, at its rear, a closed carrier ring comprising two B-columns which are connected to one another via a roof crossmember and a bottom crossmember, the first flange-mounting region being formed in the region of this carrier ring.

33. A process of constructing a driver's cab selected from a modular driver's cab construction series for heavy-goods vehicles comprising:

providing a basic cab on which at least one front driver's cab bearing and at least one rear driver's cab bearing are formed and which is constructed as standard for all vehicle variants, the basic cab having a front wall, two side walls, a door and a door frame, a bottom, and a roof, being made open to the rear, and, at its rear, possessing an annularly closed first flange-mounting region, providing a selected built-on module which can be built on said basic cab and has been selected from different built-on modules having different length dimensions for each driver's cab variant, the built-on module having a rear wall, two side-wall portions, a bottom portion and a roof portion, being made open to the front and, at the front, possessing an annularly closed second flange-mounting region complementary to the first flange-mounting region, and fastening the built-on module and the basic cab together between the first flange-mounting region and the second flange-mounting region by a flanged connection.

* * * * *